(12) United States Patent
Tu

(10) Patent No.: US 8,723,704 B2
(45) Date of Patent: May 13, 2014

(54) APPARATUS AND METHOD FOR DATA PACKING

(75) Inventor: Ying-Chieh Tu, New Taipei (TW)

(73) Assignee: MStar Semiconductor, Inc., Hsinchu County (TW)

( * ) Notice: Subject to any disclaimer, the term of this patent is extended or adjusted under 35 U.S.C. 154(b) by 14 days.

(21) Appl. No.: 13/565,932

(22) Filed: Aug. 3, 2012

(65) Prior Publication Data

US 2013/0194113 A1    Aug. 1, 2013

(30) Foreign Application Priority Data

Jan. 31, 2012   (TW) .............................. 101103159 A

(51) Int. Cl.
*H03M 7/00*    (2006.01)
(52) U.S. Cl.
USPC ............................................. 341/60; 341/87
(58) Field of Classification Search
USPC ............................................. 341/60, 67, 87
See application file for complete search history.

(56) References Cited

U.S. PATENT DOCUMENTS

| 4,467,444 | A | * | 8/1984 | Harmon et al. | 712/42 |
| 5,339,077 | A | * | 8/1994 | Venbrux et al. | 341/67 |
| 6,552,730 | B1 | * | 4/2003 | Kimura et al. | 345/562 |
| 6,694,423 | B1 | * | 2/2004 | Singh et al. | 712/204 |

* cited by examiner

*Primary Examiner* — Brian Young
(74) *Attorney, Agent, or Firm* — WPAT, PC; Justin King

(57) ABSTRACT

A data packing apparatus for continuously receiving current data is provided. The apparatus includes N barrel shifters, a controller and a packing module. The controller determines a shift amount according to a length of previous residual data, and controls the N barrel shifters to sequentially perform M barrel shifts on current merging data to achieve the shift amount, noting that N is an integer greater than or equal to two, and M is a natural number smaller than or equal to N. The packing module merges the previous residual data and the current merging data passed through the N barrel shifters. The maximum shift amounts of the M barrel shifts are smaller than a threshold associated with a length of an operation cycle. The current merged data is a part or all of the current data.

11 Claims, 8 Drawing Sheets

APPARATUS AND METHOD FOR DATA PACKING

This application claims the benefit of Taiwan application Serial No. 101103159, filed Jan. 31, 2012, the subject matter of which is incorporated herein by reference.

BACKGROUND OF THE INVENTION

1. Field of the Invention

The invention relates in general to a memory management technique, and more particularly, to a memory management technique for data packing.

2. Description of the Related Art

Recently, electronic products, such as digital cameras, video recorders, and smart phones, typically featured in capturing large-size and high-resolution images and videos attract consumers. Also, it is always a critical issue for hardware manufacturers to manufacture state-of-the-art image encoders of top quality, providing encoding and compression formats enabling a system to encode and decode information streams efficiently.

FIG. 1 shows a block diagram of a conventional image encoder. A pixel block input module 11 generates blocks with pixel data inputted at a data providing end. A converting/quantizing module 12 performs discrete cosine transform (DCT) and quantization on the blocks generated by the pixel block input module 11 to achieve a compression. Next, a run-length coding (RLC) module 13 identifies runs and lengths before the runs, and expresses the data content in the two paired parameters (run, length) to further compress the data amount. For example, quantized data 00000200007 may be expressed as (run, length)=(2, 5)(7, 4). A variable length coding (VLC) module 14 converts each set of the two paired parameters into an encoded bitstream according to a look-up table of the paired parameters outputted by the RLM 13. The length of the encoded bitstreams generated by the VLC module 14 may vary. A bitstream packing module 15 merges the encoded bitstreams generated by the VLC module 14 into packets having appropriate lengths.

An example of the bitstream packing module 15 comprising two barrel shifters shall be provided below to explain a common bitstream packing mechanism known in the prior art. Referring to FIG. 2A, barrel shifters 15A and 15B are capable of accommodating a data length of 32 bits and providing a maximum shift amount of 32 bits, respectively. The bitstream packing module 15 receives a bitstream in each cycle. Referring to FIG. 2B, in a first cycle, a bitstream a having a length of 8 bits is first stored in the barrel shifter 15A and is aligned to the left. In a subsequent second cycle, a bitstream b having a length of 16 bits is inputted into the bitstream packing module 15. In order to place the bitstream b adjacent to the right of the bitstream a, the barrel shifter 15A shifts the bitstream b by 8 bits to the right when receiving the bitstream b.

In a third cycle, a bitstream c having a length of 24 bits is transmitted to the bitstream packing module 15. Since the barrel shifter 15A has no sufficient remaining capacity, the bitstream c is divided into bitstreams c1 and c2 having a length of 8 bits and 16 bits, respectively, which are then respectively stored in the barrel shifters 15A and 15B. Assume the packet length generated by the bitstream packing module 15 is fixed at 32 bits. At this point, the bitstreams a, b, and c1 in the barrel shifter 15A are enough for a packet to be generated. Therefore, in a fourth cycle, apart from receiving a new bitstream d, the bitstream packing module 15 serially merges the bitstreams a, b, and c1 to one packet and outputs the packet. Referring to FIG. 2B, the bitstream c2 is relocated to align to the left of the barrel shifter 15A, and the bitstream d (8 bits) is stored into a segment adjacent to the bitstream c2 in the barrel shifter 15A.

It can be seen from the above descriptions that, in order to correctly serial the bitstreams, each time when receiving a bitstream, the bitstream packing module 15 is mandated to selectively relocate the bitstream to a correct segment by barrel shifting. Taking FIG. 2B for example, a start position of the bitstream b needs to be the $9^{th}$ bit from the left in the barrel shifter 15A in order to be located adjacent to the bitstream a, and so the bitstream b is shifted by 8 bits to the right. Similarly, a start position of the bitstream c needs to be the $25^{th}$ bit from the left in order to be located adjacent to the bitstream b, and so the bitstream c is shifted by 24 bits to the right. In this example, a maximum shift amount of the barrel shifters is 32 bits, since the bitstream packing module is fixed at 32 bits.

With larger image size and higher image resolution, an average length of bitstreams has increased in recent years. For example, bitstreams in earlier days do not exceed 32 bits, whereas lengths of modern bitstreams are mostly longer than 32 bits. Further, in response to the expanding amount of image data, requirements to processing speeds of encoder hardware have also become significantly higher to encode the increased bitstreams. For example, if the VLC module 14 is required to process two sets of data in each cycle, the length of the bitstreams received by the bitstream packing module 15 in each cycle may possibly be longer than 32 bits. Correspondingly, the bitstream packing module 15 needs to provide a maximum shift amount greater than 32 bits within each cycle.

A barrel shifter having a maximum shift amount greater than 32 bits (e.g., 64 bits) is not difficult in implementation. However, time for completing the shift with an intuitive design gets longer as the shift amount increases. While processing a large amount of data, if the bitstream packing module 15 cannot fully cooperate with the speed at which the VLC module 14 generates bitstreams to successfully receive, shift, merge, and output the bitstreams, the bitstream packing module 15 likely becomes the bottleneck that drags down an overall speed of the image encoder.

Assuming the quantization level of the converting/quantizing module 12 is increased to reduce the amount of subsequent data, although the speed requirement on the bitstream packing module 15 is alleviated, image quality is sacrificed—such an approach is hardly an ideal solution.

SUMMARY OF THE INVENTION

The disclosure is directed to an apparatus and method for data packing. By dividing a large shift amount into several smaller shift amounts that are respectively achieved in different phases, the apparatus and method of the disclosure is capable of accomplishing a shift effect of a single barrel shifter having a high shift capability. Further, by appropriately dividing a bitstream into merging data and residual data, the data packing apparatus and method of the disclosure in average offers higher efficiency for receiving and processing long bitstreams than a single barrel shifter having a high shift capability.

According to one embodiment of the disclosure, a data packing apparatus for continuously receiving current data is provided. The apparatus comprises N barrel shifters, a control module, and a packing module. The control module determines a shift amount according to a length of previous residual data, and controls the N barrel shifters to sequentially perform M barrel shifts on current merging data to achieve the shift amount. The packing module merges the previous residual data with the current merging data into preparatory packing data. The shift amount of each of the M barrel shifts is smaller than a threshold associated with a cycle length. Note that N is an integer greater than or equal to 2, and M is a natural number smaller than or equal to N. The current merging data is a part or all of the current data.

According to another embodiment of the disclosure, a data packing method implemented with N barrel shifters is provided. The method comprises steps of: determining a first target shift amount according to a length of previous residual data; controlling the N barrel shifters to sequentially perform barrel shifts on current merging data to achieve the first target shift amount; and merging the previous residual data and the current merging data passes through the N barrel shifters.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 3:
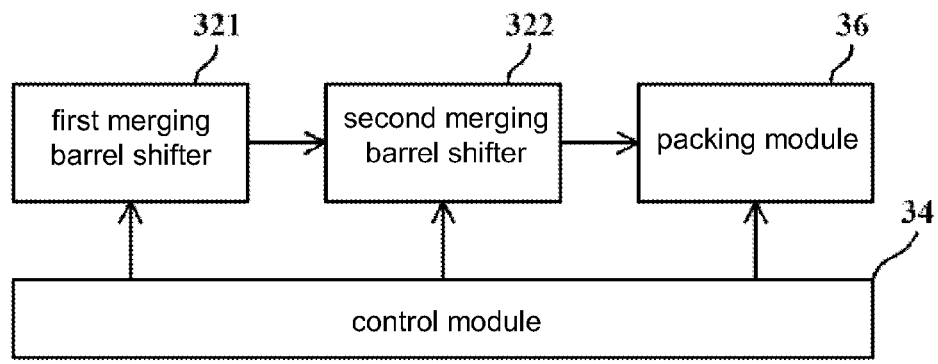
FIG. 3 is a block diagram of a data packing apparatus according to one embodiment of the disclosure.

A data packing apparatus comprising N number of merging barrel shifters is provided according to one embodiment of the disclosure, where N is an integer greater than or equal to 2. In the following description, an example of N being equal to 2 as seen in FIG. 3 is given. A person skilled in the art can easily appreciate the situation of N being greater than 2. In practice, the data packing apparatus of the present invention may be an independent unit, may be integrated into equipment capable of encoding, or may be implemented to cooperate with a system (e.g., a communication device) that needs to pack output data.

Referring to FIG. 3, a data packing apparatus 300 comprises a first merging barrel shifter 321, a second merging barrel shifter 322, a control module 34, and a packing module 36. The first merging barrel shifter 321, the second merging barrel shifter 322, and the packing module 36 are connected serially in a pipeline structure. The control module 34 controls signal transmission according to a clock signal. In this embodiment, the first merging barrel shifter 321 and the second merging barrel shifter 322 respectively provide a maximum shift amount of 32 bits. Further, the packing module 36 in this embodiment is a buffer for integrating bitstreams sent from a front end and outputting packets having a length of 64 bits. It should be noted that, the maximum shift amount and the packet length are not limited to the numbers above. For example, the maximum shift amounts of the two barrel shifters may be different, and the control module 34 may control the packing module 36 to output packets of different lengths in different cycles.

As an example, the packing module 36 is stored with a bitstream a having a length of 40 bits, and the data packing apparatus 300 shortly receives a bitstream b having a length of 24 bits. According to the length of the bitstream a, the control module 34 determines to shift the bitstream b by 40 bits so that the bitstream b may closely locate to the right of the bitstream a. FIGS. 4A to 4D illustrate how the control module 34 controls the first merging barrel shifter 321 and the second merging barrel shifter 322 perform barrel shifting on the bitstream b to achieve the 40-bit shift amount.

Figure 4A:
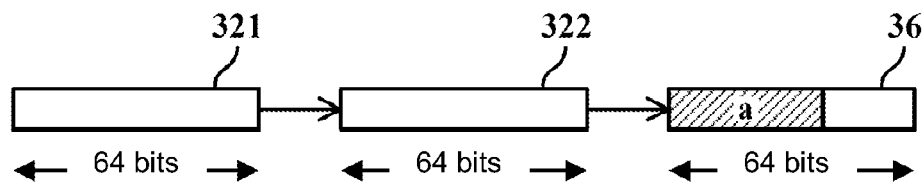
FIGS. 4A to 4D illustrate how a control module controls two barrel shifters to perform barrel shifts on bitstreams according to one embodiment of the disclosure.
Figure 4B:
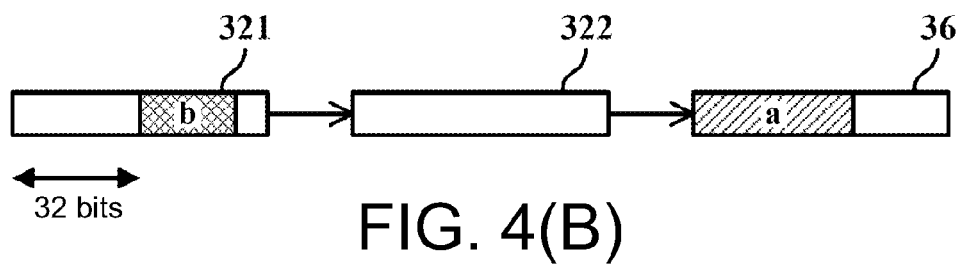
Figure 4C:
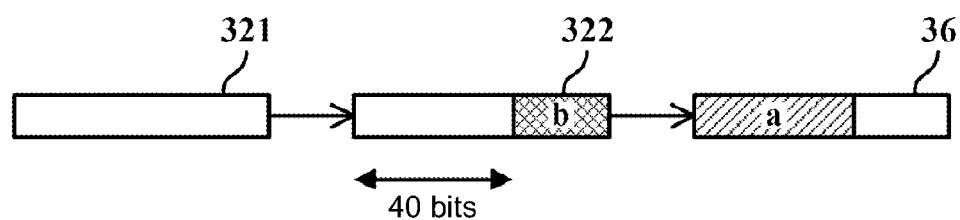
Figure 4D:
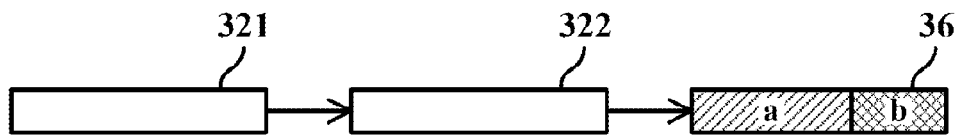

In this embodiment, the first merging barrel shifter 321 and the second merging barrel shifter 322 have 64-bit storage space, respectively. In FIG. 4A, the bitstream a is already stored in the packing module 36, and the barrel shifters 321 and 322 are not populated with any data. The bitstream a may be regarded as preparatory packing data, which is temporarily stored in the packing module 36 before forming a complete 64-bit packet. Referring to FIG. 4B, in a first cycle, the control module 34 controls the first merging barrel shifter 321 to receive the bitstream b and shift the bitstream b by 32 bits to the right. In a second cycle, as shown in FIG. 4C, the control module 34 controls the second merging barrel shifter 322 to receive the bitstream b from the first merging barrel shifter 321 and again shift the bitstream b by 8 bits to the right, such that the bitstream b is 40 bits away from the left side of the storage space. In a third cycle, as shown in FIG. 4D, the control module 34 controls the packing module 36 to directly store the bitstream b, which is received from the second merging barrel shifter 322 and is already shifted, to the storage space having a length of 24 bits at the right of the packing module 36. In one embodiment, the packing module 36 forms a complete 64-bit packet from the bitstream a and the bitstream b (i.e., the preparatory bitstream), and outputs the 64-bit packet.

It can be seen from the above descriptions that the data packing apparatus 300 divides the 40-bit shift amount into two smaller shift amounts of 32 bits and 8 bits, which are then respectively achieved by two barrel shifters in two cycles. In practice, the approach for dividing the shift amount is not limited to the values above. For example, the shift amount may be divided into 20 bits and 20 bits, or 8 bits and 32 bits. An advantage of dividing the shift amount is that, the barrel shifters are not required to have high shifting capabilities (e.g., with a maximum shift amount of 64 bits). Compared to a single barrel shifter having a maximum shift amount of 64 bits, a barrel shifter having a maximum shift amount of 32 bits is less complicated in hardware and has a faster average operating speed while achieving the same shifting. Further, by implementing the data packing apparatus 300, complications of designing a barrel shifter having a large maximum shift amount can be eliminated.

In practice, the bitstream b in FIGS. 4A to 4D may be a part or all of a bitstream inputted into the data packing apparatus 300. For example, if a length of a bitstream inputted into the data packing apparatus 300 after the bitstream a is 32 bits, the bitstream b is likely the first 24 bits of the bitstream. The remaining 8 bits of the bitstream are stored for later forming the next packet. In other words, the control module 34 calculates a remaining capacity for subsequent data according to a predetermined packet size (e.g., 64 bits) and a data length (e.g., 40 bits) previously stored into the packing module 36, and accordingly determines whether to capture a part or all of a subsequent bitstream as the bitstream b.

Figure 5A:
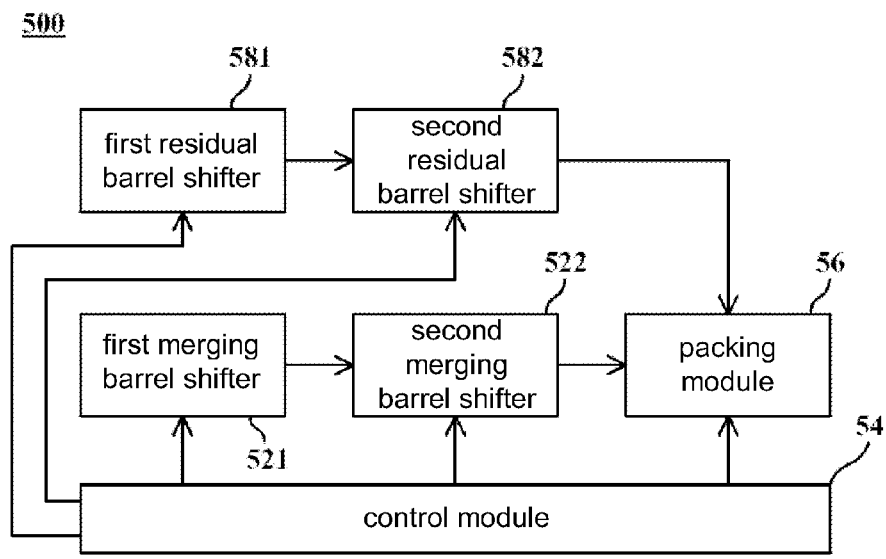
FIG. 5A is a block diagram of a data packing apparatus according to another embodiment of the disclosure.
Figure 5B:
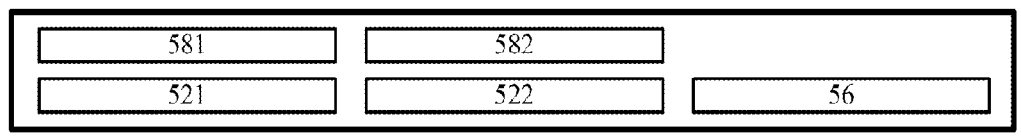
FIG. 5B shows relative positions of storage spaces in the data packing apparatus.

A data packing apparatus comprising N merging barrel shifters and N residual barrel shifters is provided according to another embodiment of the disclosure. N is an integer greater than or equal to 2. In the following description, an example of N equal to 2 in FIG. 5A shall be given. A person skilled in the art can easily appreciate the situation of N being greater than 2. A data packing apparatus 500 comprises a first merging barrel shifter 521, a second merging barrel shifter 522, a first residual barrel shifter 581, a second residual barrel shifter 582, a control module 54, and a packing module 56. Operation details of the data packing apparatus 500 according to this embodiment are described with reference to FIG. 6. For simple and clear indications in FIG. 6, instead of being individually denoted, the different elements are depicted in relative positions that can be referred to in FIG. 5B.

Figure 6:
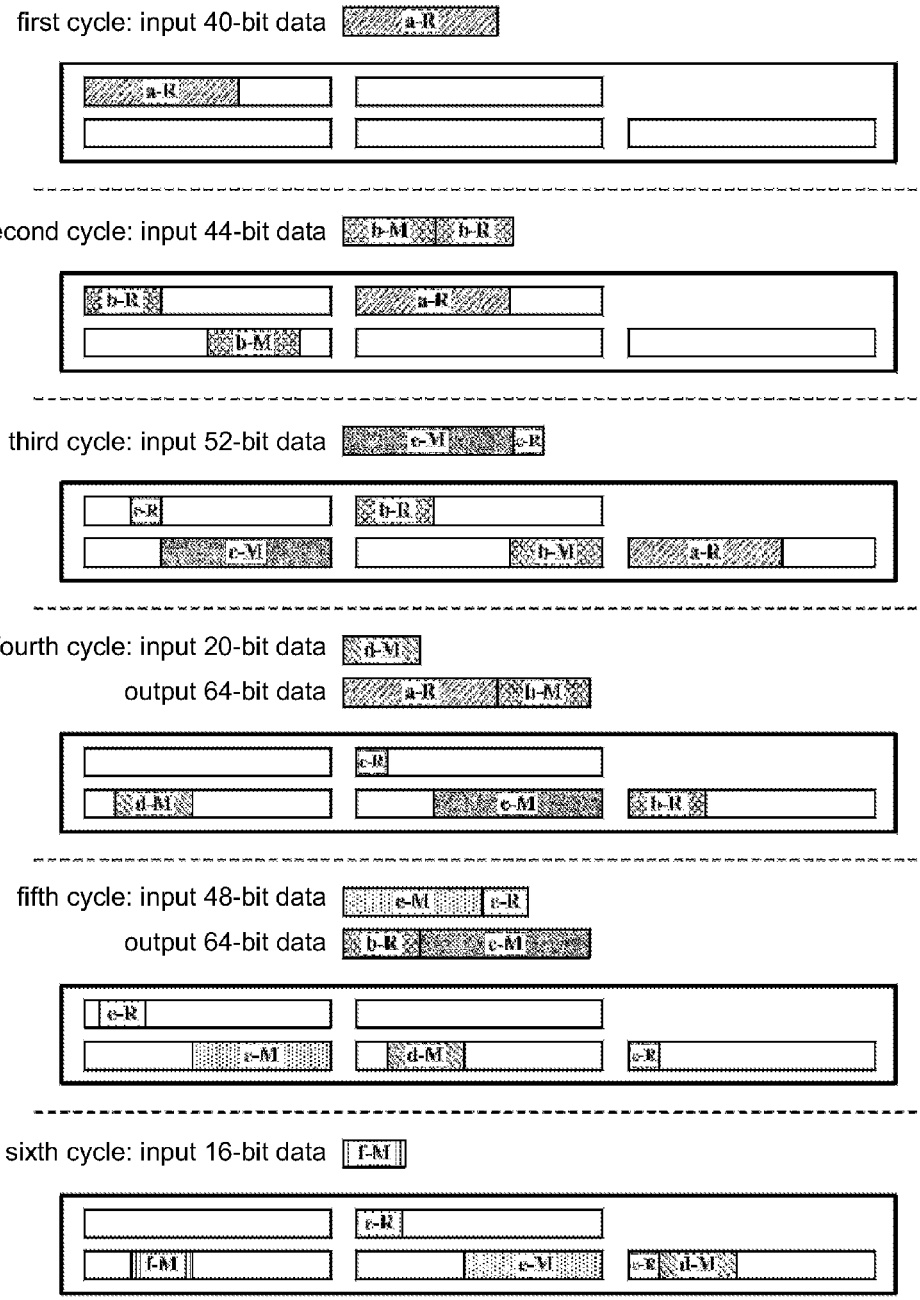
FIG. 6 illustrates a data packing apparatus performing barrel shifts on bitstreams in different cycles according to one embodiment of the disclosure.

In the embodiment in FIG. 6, the first merging barrel shifter 521, the second merging barrel shifter 522, the first residual barrel shifter 581, and the second residual barrel shifter 582 provide a maximum shift amount of 32 bits and have a storage space of 64 bits, respectively. The packing module 64 also has 64-bit storage space, and sends out one packet immediately upon collecting 64-bit data.

The first merging barrel shifter 521 and the first residual barrel shifter 581 handle a first-stage shift; the second merging barrel shifter 522 and the second residual barrel shifter 582 handle a second-stage shift. In the embodiment, the first-stage shift and the second-stage shift are connected serially to the last packing module 56 in a pipeline structure. The control module 54 controls data transmission from left to right according to a clock signal.

In a first cycle, a bitstream a having a length of 40 bits is inputted into the data packing apparatus 500. Before the first cycle, the five storage spaces in the diagram are not populated with any previous data, and the bitstream a is marked as residual data a-R. Referring to FIG. 6, the control module 54 stores and aligns the residual data a-R to the left in the first residual barrel shifter 581. In a second cycle, a bitstream b having a length of 44 bits is inputted into the data packing apparatus 500. According to a difference between the residual data a-R (40 bits) and the packing data amount (64 bits), the control module 54 determines a target merging length (64 bits−40 bits=24 bits). Therefore, in the second cycle, data corresponding to the target merging length is data to be used for forming a packet with the bitstream a-R. Since the length (44 bits) of the bit stream b is greater than the target merging length (24 bits), the control module 54 divides the bitstream b into two parts—merging data b-M having the target merging length (24 bits), and residual data b-R having a length equal to the length of the bitstream b minus the target merging length (i.e., 44 bits−24 bits=20 bits).

In the second cycle, the residual data a-R is transmitted from the first residual barrel shifter 581 to the second residual barrel shifter 582, the residual data b-R is stored into the first residual barrel shifter 581, and the merging data b-M is stored into the first merging barrel shifter 521. According to the length (40 bits) of the residual data a-R, the control module 54 determines that at least one barrel shift should be performed on the merging data b-M to achieve a right shift equal to the length (40 bits) of the residual data a-R, so as to correctly connect the merging data b-M and the residual data a-R in series. As shown in FIG. 6, the control module 54 first controls the first barrel shifter 521 to receive the merging data b-M, and to shift the merging data b-M by 32 bits to the right. It should be noted that, the control module 54 also controls the first residual barrel shifter 581 to receive the residual data b-R, and to shift the residual data b-R by a length equal to the length (24 bits) of the merging data b-M to the right, such that a start position of the residual data b-R is aligned with the leftmost end of the first residual barrel shifter 581. As shown, since the residual data b-R is originally located at the right of the merging data b-M, it is necessary that the residual data b-R be shifted by a length equal to the length of the merging data b-M to the left in order to allow the start position of the residual data b-R to be aligned with the leftmost end of the first residual barrel shifter 581.

In a third cycle, a bitstream c having a length of 52 bits is inputted into the data packing apparatus 500. The residual data a-R is transmitted from the second residual barrel shifter 582 to the packing module 56, the residual data b-R is transmitted from the first residual barrel shifter 581 to the second residual barrel shifter 582, and the merging data b-M is transmitted from the first merging barrel shifter 521 to the second merging barrel shifter 522. As shown in FIG. 6, the control module 54 controls the second merging barrel shifter 522 to receive the merging data b-M and to shift the merging data b-M by 8 bits to the right, so that a difference between a start position of the merging data b-M and the leftmost end of the second merging barrel shifter 522 is equal to the length (40 bits) of the residual a-R.

Similarly, according to the difference between the residual data (20 bits) and the packing data amount (64 bits), the control module 54 determines a target merging length (44 bits), and accordingly divides the bitstream c into two parts—merging data c-M having the target merging length (44 bits), and residual data c-R having a length equal to the length of the bitstream c minus the target merging length (i.e., 52 bits−424 bits=8 bits).

According to the length (20 bits) of the residual data b-R, in order to achieve a right shift equal to the length (20 bits) of the residual data b-R, the control module 54 determines that at least one barrel shift should be performed on the merging data c-M before sending the merging data c-M into the packing module 56, so that the merging data c-M and the residual data b-R can be correctly connected in series. As shown in FIG. 6, the control module 54 controls the first merging barrel shifter 521 to shift the merging data c-M by 20 bits to the right at the time of receiving the merging data c-M. Since the length of the merging data c-M is greater than the maximum shift amount of 32 bits, the control module 54 controls the first residual barrel shifter 581 to receive the residual data c-R, and to shift the residual data c-R by the maximum shift amount (32 bits) to the left, so that a start position of the residual data c-R moves towards the leftmost end of the first residual barrel shifter 581. A difference of 12 bits (i.e., the 44-bit length of the merging data c-M minus the 32-bit maximum shift amount) between the residual data c-R and the leftmost end of the storage space shall be eliminated in a fourth cycle.

In the fourth cycle, a bitstream d having a length of 20 bits is inputted into the data packing apparatus 500. At this point, the bitstream a-R in the packing module 56 and the merging data b-M in the second merging barrel shifter 582 are packed into a complete 64-bit packet and be outputted. Referring to FIG. 6, the residual data b-R is transmitted from the second residual barrel shifter 582 to the packing module 56, the residual data c-R is transmitted from the first residual barrel shifter 581 to the second residual barrel shifter 582, and the merging data c-M is transmitted from the first merging barrel shifter 521 to the second merging barrel shifter 522. It should be noted that, the control module 54 controls the second residual barrel shifter 582 to receive the residual data c-R and to shift the residual data c-R by 12 bits to the left, so that a start position of the residual data c-R is aligned with the leftmost end of the second residual barrel shifter 582.

According to a difference between the length of the residual data c-R (8 bits) and the packing data amount (64 bits), the control module 54 determines a target merging length (56 bits), and accordingly determines not to divide the bitstream d. The whole bitstream d is marked as merging data d-M. According to the length of the residual data c-R (8 bits), the control module 54 determines that at least one barrel shift should be performed on the merging data d-M before sending the merging data d-M into the packing module 56 to achieve a right shift equal to the length of the residual data c-R (8 bits), so as to correctly connect the merging data d-M and the residual data c-R in series. As shown in FIG. 6, the control module 54 controls the first merging barrel shifter 521 to receive the merging data d-M, and to shift the merging data d-M by 8 bits to the right.

In a fifth cycle, a bitstream e having a length of 48 bits is inputted into the data packing apparatus 500. At this point, the bitstream b-R in the packing module 56 and the merging data c-M in the second merging barrel shifter 522 are packed into a complete 64-bit packet that is then outputted. Referring to FIG. 6, the residual data c-R is transmitted from the second residual barrel shifter 582 to the packing module 56, and the merging data d-M is transmitted from the first merging barrel shifter 521 to the second merging barrel shifter 522. According to a difference between a total length of the residual data c-R (28 bits) and the merging data d-M and the packing data amount (64 bits), the control module 54 determines a target merging length (36 bits), and accordingly divides the bitstream e into two parts—merging data e-M having a length equal to the target merging length (36 bits), and residual data e-R having a length equal to the length of the bitstream e minus the target merging length. That is, the residual data e-R has a length of 12 bits (48 bits−36 bits=12 bits).

At this point, the packing module 56 is stored with the residual data c-R and the merging data d-M. According to the total length (28 bits) of the residual data c-R and the merging data d-M, the control module 54 determines that at least one barrel shift should be performed on the merging data d-M before sending the merging data d-M into the packing module 56 to achieve a right shift equal to the total length of the residual data c-R (28 bits) and the merging data d-M, so as to correctly connect the merging data e-M and the merging data d-M in series. As shown in FIG. 6, the control module 54 controls the first merging barrel shifter 521 to receive the merging data e-M, and to shift the merging data e-M by 28 bits to the right. Because the length of the merging data e-M is greater than the maximum shift amount (32 bits), the control module 54 controls the first residual barrel shifter 581 to receive the residual data e-R and to shift the residual data e-R by the maximum shift amount (32 bits) to the left, so that a start position of the residual data e-R moves towards the leftmost end of the first residual barrel shifter 581. A difference of 4 bits (i.e., the 36-bit length of the merging data e-M minus the 32-bit maximum shift amount) between the residual data e-R and the leftmost end of the storage space shall be eliminated in a sixth cycle.

In the sixth cycle, a bitstream f having a length of 16 bits is inputted into the data packing apparatus 500. The merging data d-M in the second merging barrel shifter 522 is transmitted to the packing module; the residual data c-R and the merging data d-M are not enough for a complete packet and remain stored in the packing module 56. As shown in FIG. 6, the residual data e-R is transmitted from the first residual barrel shifter 581 to the second residual barrel shifter 582, and the merging data e-M is transmitted from the first merging barrel shifter 521 to the second merging barrel shifter 522. It should be noted that, the control module 54 controls the second residual barrel shifter 582 to receive the residual data e-R and to shift the residual data e-R by 4 bits to the left, so that a start position of the residual data e-R is aligned with the leftmost end of the second residual barrel shifter 582.

According to a difference between a length of the residual data e-R (12 bits) and the packing data amount (64 bits), the control module 54 determines a target merging length (52 bits), and determines not to divide the bitstream f. All of the bitstream f is marked as merging data f-M. According to the length of the residual data e-R (12 bits), the control module 54 determines that at least one barrel shift should be performed on the merging data f-M before sending the merging data f-M into the packing module 56 to achieve a right shift equal to the length (12 bits) of the residual data e-R, so as to correctly connect the merging data f-M and the residual data e-R in series. As shown in FIG. 6, the control module 54 controls the first merging barrel shifter 521 to receive the merging data f-M, and to shift the merging data f-M by 12 bits to the right.

In practice, the foregoing bitstreams a-f may be a combination of several successive bitstreams, or one long bitstream. For a newly inputted bitstream in each cycle, the control module 54 first determines whether to divide current data into merging data and residual data. Next, the control module 54 determines a first target shift amount with respect to the merging data according to a length of previous residual data, and controls N merging barrel shifters to perform M barrel shifts on the current merging data to achieve the first target shift amount. M is a natural number smaller than or equal to N, and equals 0 in the absence of previous residual data.

Further, the control module 54 determines a second target shift amount with respect to the residual data according to a length of the current merging data, and controls the N residual shifters to sequentially perform P barrel shifts on the current residual data to achieve the second target barrel shift, so that a start position of the current residual data is moved to be aligned with the leftmost end of the storage space of the packing module 56. Note that P is a natural number smaller than or equal to N.

Figure 1:
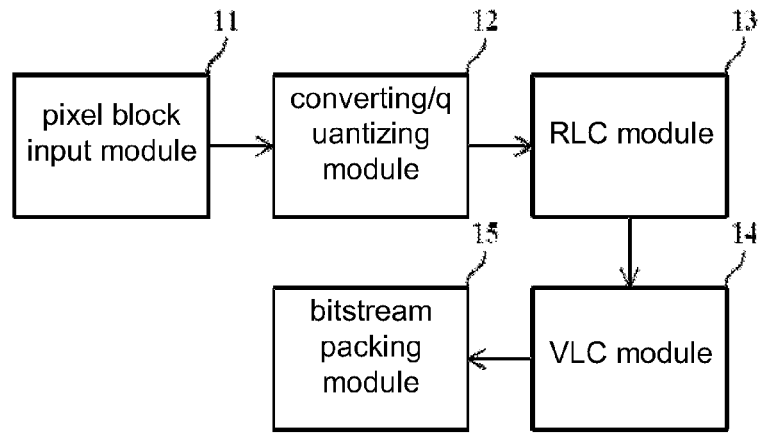
FIG. 1 is a block diagram of an image encoder known in the prior art.
Figure 2A:
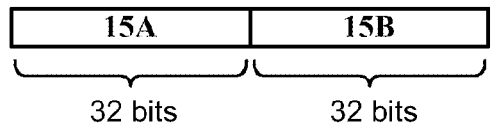
FIG. 2A show capacities of two barrel shifters.
Figure 2B:
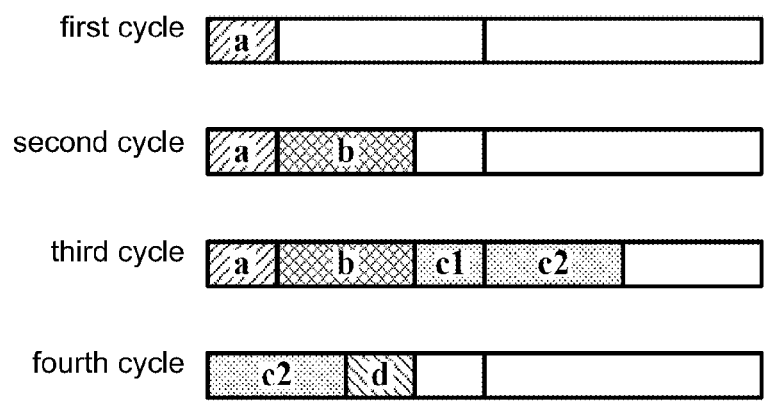
FIG. 2B illustrates a current bitstream packing mechanism.

It should be noted that, a maximum of the M barrel shifts and the P barrel shifts are smaller than a threshold (e.g., smaller than 32 bits), respectively. The threshold is associated with a cycle length. More specifically, the maximum shift amount is designed to ensure that the barrel shifters can complete designated shift operations within a predetermined cycle. Taking the image encoding structure shown in FIG. 1 as an example, assuming in a predetermined cycle, the VLC module generates two bitstreams to be provided to the bitstream packing module, the foregoing maximum shift amount is then designed to be smaller than the shift amount that the barrel shifters can successfully achieve within the predetermined cycle. Thus, regardless of whether the VLC module generates two bitstreams or one longer bitstream, the data packing apparatus of the disclosure is capable of receiving and processing the bitstreams to prevent a situation that a front-end circuit is halted due to waiting for the subsequent data packing apparatus. For a system that values throughput, the data packing apparatus 500 of the disclosure is capable of preventing a data packing procedure from becoming a bottleneck of a speed of overall data processing.

It is observed from the above descriptions that, for both merging data and residual data, the data packing apparatus 500 divides a shift amount greater than a predetermined shift amount (32 bits) into two shift amounts, which are respectively achieved in two different shift phases. In practice, the numbers of divided shifts and shift phases are not limited to the examples above. For even longer data, the data packing apparatus of the disclosure may further comprise more (e.g., 3 or 4) shift phases or provide larger storage spaces. Further, the concept of the invention is also suitable for fixed length of bitstreams. Although the start position of the storage space is at the right of the storage space in the above descriptions, the concept of the disclosure is also applicable to a storage space having a start position at other positions (e.g., the right side) of the storage space.

Figure 7:
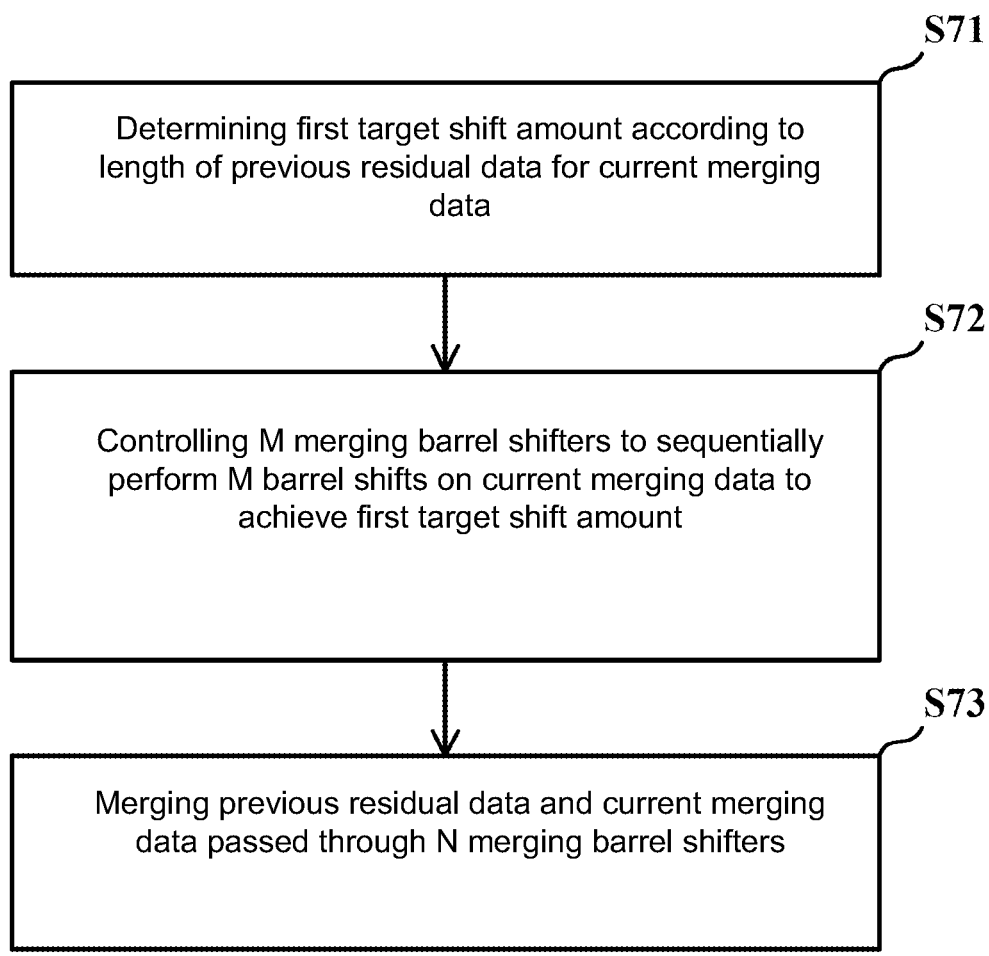
FIG. 7 is a flowchart of a data packing method according to one embodiment of the disclosure.

FIG. 7 shows a flowchart of a data packing method according to another embodiment of the disclosure. The method is implemented using N merging barrel shifters, where N is an integer greater than or equal to 2. In Step S71, a first target shift amount is determined according to a length of previous residual data for current merging data. In Step S72, the N merging barrel shifters are controlled to sequentially perform M barrel shifts on the current merging data to achieve the first target shift amount, where M is a natural number smaller than or equal to N. In Step S73, the previous residual data and the current merging data that pass through the N merging barrel shifters are merged.

Figure 8:
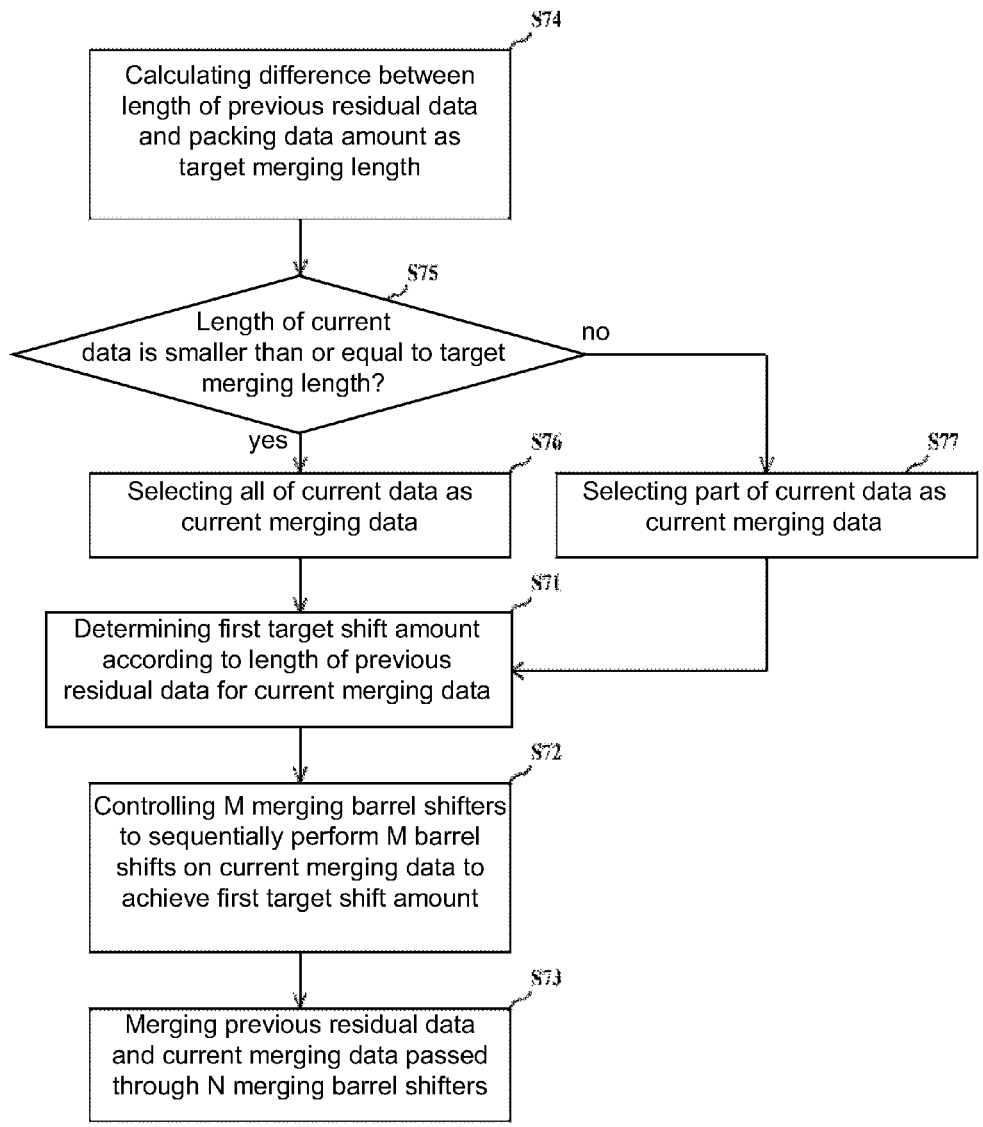
FIG. 8 is a flowchart of a data packing method according to another embodiment of the disclosure.

Referring to FIG. 8, in another embodiment, the data packing method of the disclosure may further comprise Steps S74 to S77. In Step S74, a difference between the length of the previous residual data and a packing data amount is calculated as a target merging length. In Step S75, it is determined whether a length of the current data is smaller than or equal to the target merging length. When a result of Step S75 is affirmative, Step S76 is performed to select a part of the current data as the current merging data, and to have a length of the current merging data to equal to the target merging length, otherwise in Step 77, a part of the current data is used as the current merging data.

Figure 9:
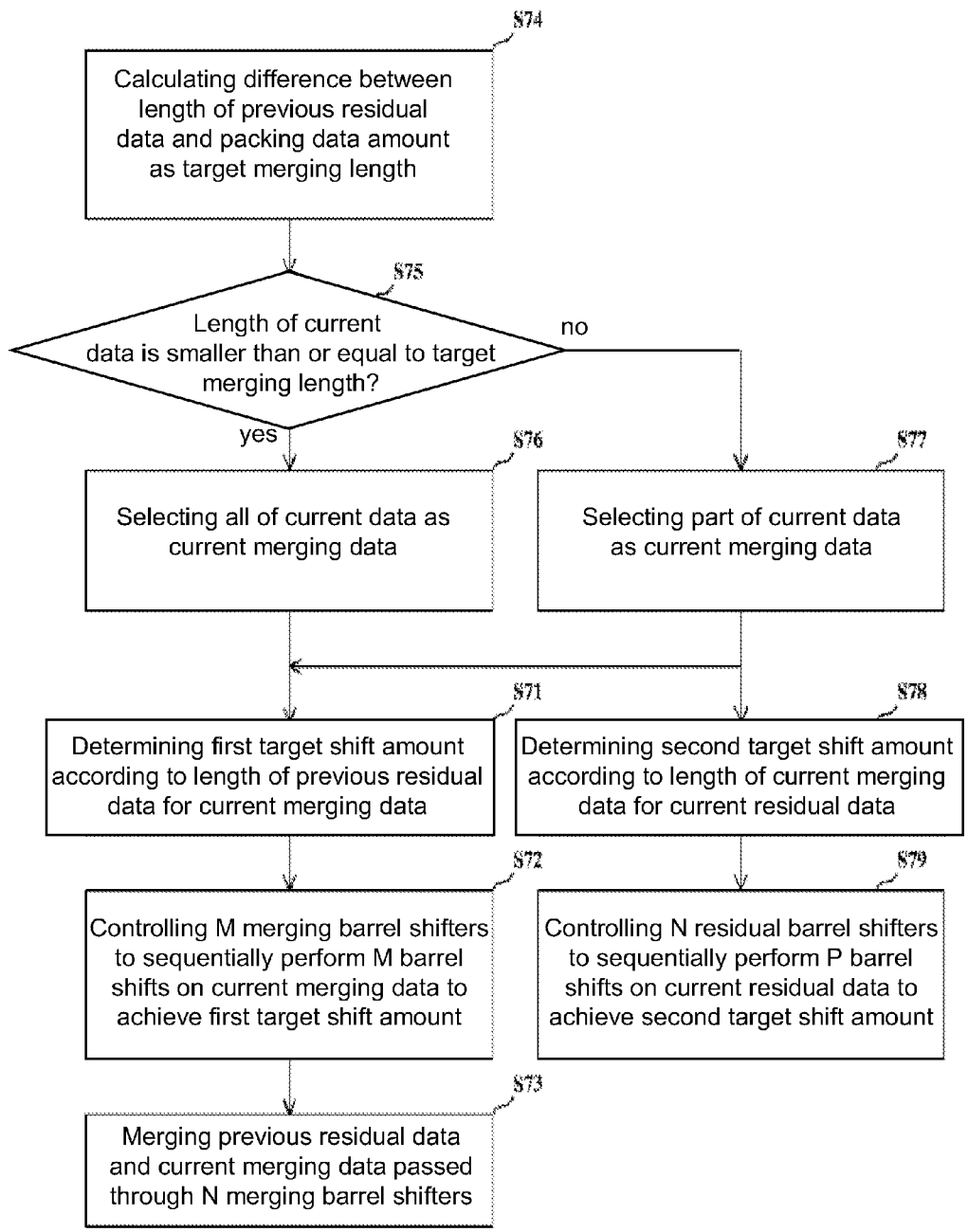
FIG. 9 is a flowchart of a data packing method according to yet another embodiment of the disclosure.

Referring to FIG. 9, in another embodiment, when the result of Step S75 is negative, in Step S77, apart from using a part of the current data as the current merging data, a part excluding the current merging data in the current data is further selected as current residual data. After Step S77, Steps S78 to S79 are also performed in addition to Steps S71 to S73. In Step S78, a second target shift amount is determined according to the length of the current merging data for the current residual data. In Step S79, the N residual barrel shifters are controlled to sequentially perform P barrel shifts on the current residual data to achieve the second target shift amount.

It should be noted that, the data packing method in FIGS. 7 to 9 may also be incorporated into various modifications in the discussion of the data packing apparatus, and related details shall be omitted herein for the sake of brevity.

Therefore, a novel data packing apparatus and method is provided according to the disclosure. By dividing a large shift amount into several smaller shift amounts that are respectively achieved in different phases, the data packing apparatus and method of the disclosure is capable of accomplishing a shift effect equal to that of a single barrel shifter having a high shift capability. Further, by appropriately dividing a bitstream into merging data and residual data, the data packing apparatus and method of the disclosure in average offers higher efficiency for receiving and processing long bitstreams than a single barrel shifter having a high shift capability.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data packing apparatus, for receiving current data, comprising:

N number of merging barrel shifters, N being an integer greater than or equal to 2;

a control module, for determining a first target shift amount according to a length of previous residual data, and controlling the N number of merging barrel shifters to sequentially perform M times of barrel shifts on current merging data for the first target shift amount, where M being is a natural number smaller than or equal to N; and a packing module, for merging the previous residual data and the current merging data into preparatory packing data;

wherein, a shift amount of each of the M barrel shifts is smaller than a threshold associated with a cycle length, and the current merging data are a part or all of the current data.

2. The data packing apparatus according to claim 1, wherein the N number of merging barrel shifters are serially connected in a pipeline structure, and the packing module outputs the preparatory packing data when a length of the preparatory packing data is equal to a predetermined packet length, and updates the preparatory packing data as the previous residual data when the length of the preparatory packing data is smaller than the predetermined packet length.

3. The data packing apparatus according to claim 1, wherein M is greater than or equal to 2 when the target shift amount is greater than a threshold associated with a cycle, and a shift amount of each of the barrel shifts is smaller than or equal to the threshold.

4. The data packing apparatus according to claim 1, wherein a difference between the length of the previous residual data and a packing data amount is a target merging length; the control module further determines whether the length of the current data is smaller than or equal to the target merging length to generate a determination result; and the control module selects the whole current data as the current merging data when the determination result is affirmative, and selects a part of the current data as the current data when the determination result is negative to make the length of the current merging data equal to the target merging length.

5. The data packing apparatus according to claim 4, wherein when the determination result is negative, the control module further selects a part excluding the current merging data in the current data as current residual data; the data packing apparatus further comprising:

N number of residual barrel shifters;

wherein, the control module determines a second target shift amount according to the length of the length of the current merging data, and controls the N number of residual barrel shifters to sequentially perform P times of barrel shifts on the current residual data to achieve the second target shift amount; P is a natural number smaller than or equal to N, and a maximum shift amount of each barrel shifts is smaller than the threshold.

6. A data packing method, for receiving current data using N number of merging barrel shifters, N being an integer greater than or equal to 2, the method comprising:

determining a first target shift amount according to a length of previous residual data;

controlling the N merging barrel shifters to sequentially perform M times of barrel shifts on current merging data for the first target shift amount, M being a natural number smaller than or equal to N; and merging the previous residual data and the current merging data into preparatory packing data;

wherein, a shift amount of each of the M barrel shifts is smaller than a threshold associated with a cycle length, and the current merging data associates with the current data.

7. The data packing method according to claim 6, wherein the current merging data is a part or all of the current data.

8. The data packing method according to claim 6, the N number of merging barrel shifters being serially connected in a pipeline structure, the method further comprising:

outputting the preparatory packing data when a length of the preparatory packing data equals to a predetermined packet length; and updating the preparatory packing data as the previous residual data when the length of the preparatory packing data is smaller than the predetermined packet length.

9. The data packing method according to claim 6, wherein M is greater than or equal to 2 when the target shift amount is greater than a threshold associated with a cycle, and a shift amount of each of the barrel shifts is set to being smaller than or equal to the threshold.

10. The data packing method according to claim 6, before the step of determining the first target shift amount, further comprising:

calculating a difference between the length of the previous residual data and a packing data amount as a target merging length;

determining whether the length of the current data is smaller than or equal to the target merging length to generate a determination result;

when the determination result is affirmative, selecting the whole current data as the current merging data; and when the determination result is negative, selecting a part of the current data as the current data to make the length of the current merging data equal to the target merging length.

11. The data packing method according to claim 10, with N residual barrel shifters, further comprising:

when the determination result is negative, selecting a part excluding the current merging data in the current data as current residual data;

determining a second target shift amount according to the length of the current merging data; and controlling the N residual barrel shifters to sequentially perform P times of barrel shifts on the current residual data to achieve the second target shift amount; wherein, P is a natural number smaller than or equal to N, and a maximum shift amount of each of the P barrel shifts is smaller than the threshold.

\* \* \* \* \*